United States Patent [19]

Baxter

[11] Patent Number: 4,629,827
[45] Date of Patent: Dec. 16, 1986

[54] CABLES HAVING INSULATING JACKETS

[75] Inventor: Gordon D. Baxter, Kingston, Canada

[73] Assignee: Northern Telecom Limited, Montreal, Canada

[21] Appl. No.: 791,814

[22] Filed: Oct. 28, 1985

Related U.S. Application Data

[62] Division of Ser. No. 565,631, Dec. 27, 1983, Pat. No. 4,568,507.

[51] Int. Cl.⁴ .............................................. H01B 7/22
[52] U.S. Cl. ........................... 174/102 D; 174/102 R; 174/136
[58] Field of Search ......... 174/102 R, 102 D, 102 SP, 174/115, 70 R, 136

[56] References Cited

U.S. PATENT DOCUMENTS

| | | | |
|---|---|---|---|
| 2,795,641 | 6/1957 | Rowell | 174/69 |
| 3,474,189 | 10/1969 | Plate et al. | 174/102 R |
| 3,666,877 | 5/1972 | Arnaudir, Jr. et al. | 174/115 |
| 4,469,539 | 9/1984 | Wade et al. | 174/115 X |

Primary Examiner—Arthur T. Grimley
Assistant Examiner—Morris H. Nimmo
Attorney, Agent, or Firm—R. J. Austin

[57] ABSTRACT

Cable with tensile reinforcement in the jacket in which the reinforcement is formed by succeeding tape lengths. Bonding or otherwise securing together of these lengths is avoided by overlapping them and interengaging projections of one into indentations in the other.

2 Claims, 6 Drawing Figures

CABLES HAVING INSULATING JACKETS

This invention relates to cables having insulating jackets and is a divisional of application serial No. 565,631, filed Dec. 27, 1983 now U.S. Pat. No. 4,568,507, granted Feb. 4, 1986.

Electrical and telecommunications cables are known having insulating jackets, within which tensile reinforcing tape members are provided to resist extension of the cables when a tensile force is applied, such as during cable laying or when cables are strung between supports. The tensile tape members are provided in certain spooled lengths and to enable a cable to be made of any required length which is not determined by the lengths of tape, it is necessary to join the tapes together before their passage through an extruder to be embedded within the jacket material. Bonding between the tape lengths, which may be by way of brazing or soldering (where the tape is made of metal) is an inconvenient operation which needs to be performed as the cable is being provided with its jacket and may slow down the jacketing process.

The present invention provides a method of providing a cable core with a jacket having a tensile tape member embedded therein and in which the bonding or joining problem between tape lengths is avoided.

The invention is concerned with the use of tape lengths having indentations and projections formed on opposite side surfaces and these lengths are joined together as they are fed towards and into the extruder by overlying leading and trailing end portions of the lengths with the projections and indentations mechanically interengaged so that each length draws a succeeding length into the extruder.

Accordingly, the invention provides a method of providing a cable core with an insulating jacket, having at least one longitudinally extending tensile reinforcing tape member comprising passing the core through an extruder to form the jacket, while guiding succeeding lengths of tensile tape to form the member into a position within the extrudate and spaced outwardly from the core, each length formed with indentations on one side surface and corresponding projections on the other surface, and joining succeeding lengths together solely by overlying of leading and trailing end portions of the lengths with the projections of one portion mechanically interengaged with the indentations of the other portion, whereby each length draws a succeeding length into the extruder.

With the above process because of the interengagement between the projections and indentations, the need for bonding together of the lengths such as by soldering or brazing is avoided.

In each length it is preferable that the projections and indentations are formed by transversely extending corrugations for part of its width, the remainder of the width being substantially planar. Alternatively other types of projections and indentations may be provided such as localized pips and indents on the opposing surfaces.

According to a further aspect of the invention, an extrusion die assembly is provided which comprises die members defining flow passage means for extrudate to form an insulating jacket around a cable core, die orifice forming means, guide passage means for guiding a cable core into the flow passage means and through the die orifice formed by the forming means, and tape guide means to guide succeeding lengths of tensile tape into the flow passage means to provide a longitudinally extending tensile tape member embedded in the jacket, the guide means allowing for the succeeding lengths to have overlapping leading and trailing end portions with projections in one portion mechanically interengaged with indentations in the other portion.

The invention further provides a cable having a cable core surrounded by an insulating jacket, with at least one longitudinally extending tensile tape member embedded therein, the tape member formed from succeeding lengths of tensile tape with succeeding lengths overlapping over end portions and having projections in one portion of an overlap interengaged with corresponding indentations in the other portion of the overlap.

Embodiments of the invention will now be described by way of example, with reference to the accompanying drawings in which.

Figure 1:
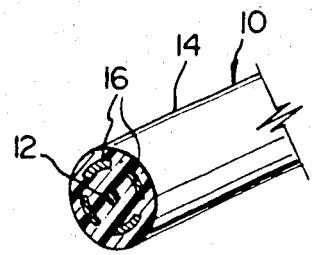
FIG. 1 is an isometric view of part of a cable.

As shown by FIG. 1, a telecommunications cable is a buried service wire 10. The cable 10 comprises a core 12 formed from a small number of conductors, i.e. two or four twisted pairs of conductors. Surrounding the core 12 is a polymeric jacket 14 of any suitable material. Within the jacket are embedded four longitudinally extending tensile tape members 16. These tape members are provided to accommodate any tensile stresses in the cable and to prevent any undue stretching of the small number of conductors in the core 12 when the cable is buried. Also, they serve as a protection against shovels while being buried or unearthed.

Figure 2:
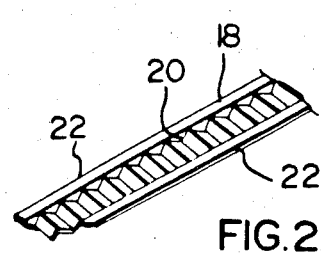
FIG. 2 is an isometric view of part of a length of tensile tape forming a tensile tape member in the cable.

Each tensile tape member 16 is formed from succeeding lengths 18 (FIGS. 2 and 3) of steel tape. Each length of tape is formed with transversely extending corrugations 20, which occupy a central region of the tape and are bordered by planar uncorrugated edge regions 22 of the tape.

Figure 3:
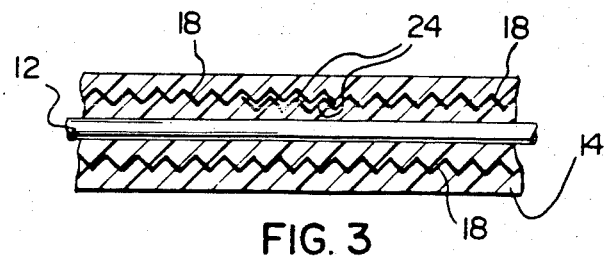
FIG. 3 is a longitudinal cross-sectional view through the cable of FIG. 1 showing its construction.

Because the length of the cable is dictated by customer requirements, the cable is no longer than any particular length 18 of steel tape. Thus, to form the cable in the required length, it is necessary to continue the tensile stresses from one tape length 18 to another in each member 16. Continuation from one tape length to another is performed by overlapping end portions 24 of succeeding lengths 18 as shown in FIG. 3. Each overlapping portion 24 has projections on one of its surfaces formed by the corrugations, interengaged with the indentations on a surface of the other length, these indentations also being formed by the corrugations. As shown in FIG. 3, therefore, the overlapping portions fit snugly and substantially intimately together. In the event that a tensile load is applied to the cable, then this is taken by each of the tensile tape members 16 and is transmitted from one length 18 to another in each member by the interengagement of the corrugations so that there is continuity in resistance to stretching along the cable length. As will be seen, this continuity in tensile strength is accomplished with succeeding lengths of tape without the need for joining the lengths 18 in conventional fashion, i.e. by soldering, brazing or otherwise bonding of the lengths.

Figure 4:
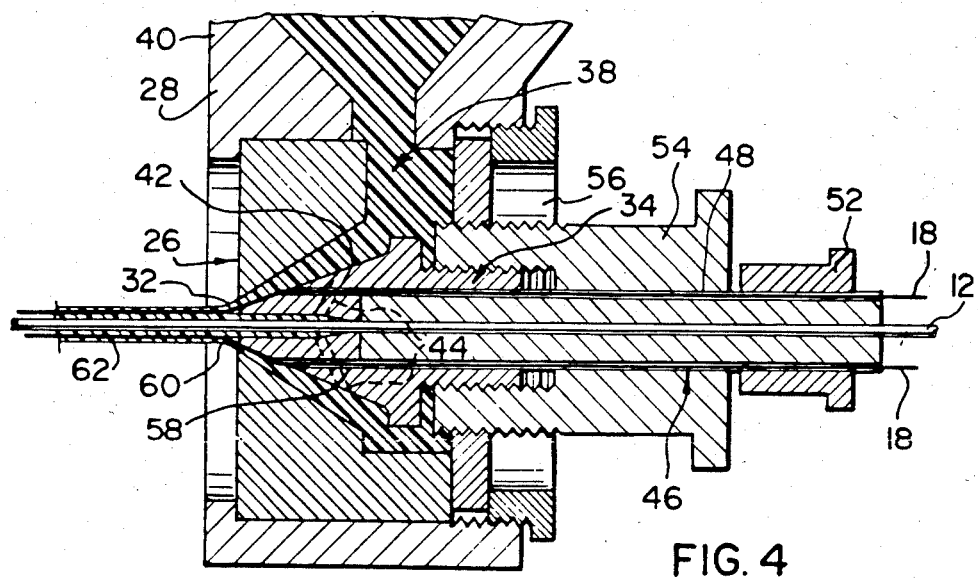
FIG. 4 is a cross-sectional view through part of an extrusion die assembly according to a first embodiment and showing a cable core in the process of being provided with a jacket to form the cable of FIG. 1.
Figure 5:
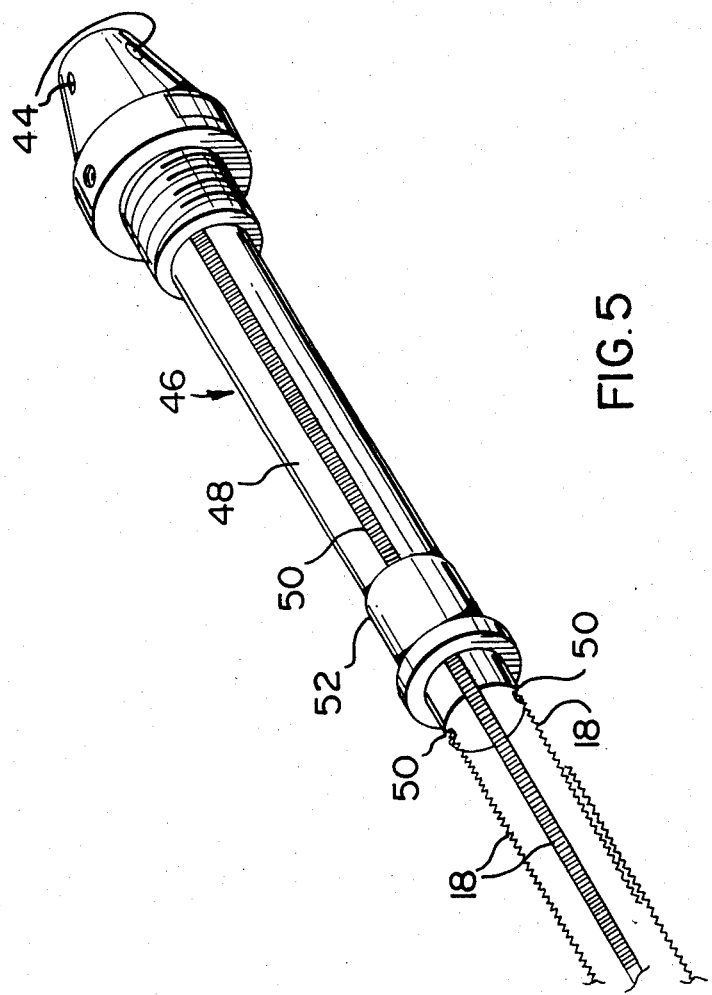
FIG. 5 is an isometric view in the direction of arrow V in FIG. 4 of part of the extrusion die.

FIG. 4 shows an extrusion die assembly 26 for providing the jacket with embedded tensile tape members 16. This die assembly 26 is housed within an annular extruder head housing 28. The assembly 26 comprises a front die 30 defining a die orifice 32. The assembly also comprises a core tube 34. The core tube is formed with a coaxial central guide passage 36 for the cable core 12 to guide the core through the die orifice 32. Between the core tube and the front die there is defined a main flow passage 38 leading from an extruder 40 to the die orifice 32. The core tube 34 is tapered towards its front end, as shown in FIGS. 4, and 5 and this taper defines a reduction in diameter of the passageway 38, together with the front die 30. The core tube is also formed with four flow passages 44 which extend inwardly through the core tube from its surface 42 and open into the guide passage 36. The flow passages 44 are directed slightly towards the die orifice 32 as they extend through the core tube and are equally spaced apart around the core tube in a circumferential direction as shown by FIG. 5.

The core tube 34 forms part of a tape guide means 46 to guide succeeding lengths 18 of the tape into the passage 38 for the purpose of embedding the tape members 18 within the jacket. The tape guide means is more clearly shown in FIG. 5 and also comprises a guide tube 48, which is secured into the core tube 34 and extends upstream from it and out of the die assembly. As shown particularly by FIG. 5, the guide tube 48 is formed with four slots 50 of substantially rectangular cross-section, the slots extending end to end of the tube and equally spaced apart around the circumference of the tube. The slots are of sufficient depth to enable a trailing end portion of a tape length 18 to be overlapped by a leading end portion of a succeeding tape length 18 by interengagement of the projections and indentations of the tape lengths as described with reference to FIGS. 1, 2 and 3. At the upstream end of the tube 48 is provided a means to ensure that the overlapping portions of the tape lengths remain in interengagement when they first enter their respective slot 50. This means 52 is in the form of a collar surrounding the upstream end of the tube so as to close the radially outer side of the slots 50. The length of the tube 48 is controlled by a core tube holding nut 54, which is screwthreadedly received in a rear die plate 56 to hold the core tube and thus the guide means in its position. The nut 54 is also screwthreadedly received upon the core tube as shown in FIG. 4 and adjustment may be obtained between the nut die plate 56 and the core tube to enable axial movement of the core tube, thereby to vary the thickness of extrudate issuing through the die orifice 32 from between the die 30 and the surface 44 of the core tube.

The slots 50 are continued through the core tube 34 as rectangular passages 58 which alternate with the flow passages 44 circumferentially around the core tube.

In use of the assembly shown in FIG. 4, the cable core 12 is fed through the tube 48 and then through its guide passage 36 and through the die orifice. Extrudate being forced from the extruder passes through the passage 38 and along the flow passages 44 so as to enter the passage 36 and surround the core 12 as an inner layer 60 of the jacket material. As is shown by FIG. 4, the diameter of the passage 36 increases slightly at the flow passages 44 to allow the formation of the inner layer 60 of the jacket. Simultaneously the tape lengths 18 are passed along their guide channels 50 in the tube 48 and pass through the passages 58 to emerge in the annular passage 38 downstream of the passages 44. The force of the extrudate along the passage 38 causes the tape lengths to be deflected down along the tapered surface 42 of the core tube to push them onto the inner layer 60 of the jacket. The extrudate issuing through the die orifice from the annular passage 38 engages the outer surface of the inner layer 60 to form the outer layer 62 of the insulation, thereby embedding the tape members 16 between the two layers. In use of the assembly of FIG. 4, because the exit from the annular passage 38 at the die orifice 32 is into ambient atmosphere, then there is a pressure reduction in the extrudate as it forms the outer layer 62. Thus, the flow passages 44 provide an inner layer under extrusion pressure onto the core 12, while the outer layer 62 in being formed at a reduced pressure provides a smooth surface finish to the final insulation which is not affected by extrusion pressure. At the time of the application of the outer layer, the inner layer having just been formed, still has a substantially raw surface and is still substantially at its extruded temperature. Thus, there is great attraction between the surfaces of the two layers formed from the same material so that they join together and fuse substantially at their interfaces at which the reinforcing filaments are embedded.

Upon the length 18 of any of the members 16 terminating as it approaches the die assembly, the leading end of a succeeding length 18 is overlapped with it and is fed into the appropriate slot 50, in overlapping and interengaged relationship as has been described. This is a simple operation which avoids the soldering or brazing operation normally performed. As the overlapped portions move into their slot 50, they are restrained from moving out of engagement by the collar 52 and thence proceed in interengaged relationship completely along the slot and from the passage 58 into the flow passage 38. The extrusion pressure in the passage 38, apart from deflecting the members downwardly as shown in FIG. 4, also serves to retain them in interengaged relationship until they are held in this position embedded between the two layers of insulation.

Figure 6:
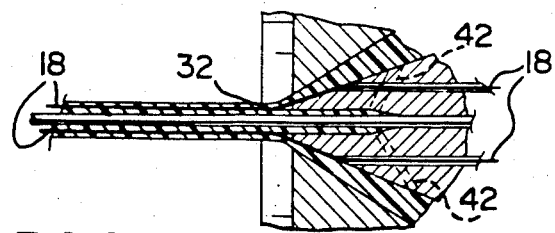
FIG. 6 is a view similar to FIG. 4 of an extrusion die according to a second embodiment.

In a second method of forming the jacket as shown in FIG. 6, a die assembly is substantially as described with reference to FIG. 4 and for similar parts, the same reference numerals will be used. In the assembly of FIG. 6, however, the core tube 34 terminates upstream from the die orifice 32 so that the flow passage 38 directs extrudate onto the inner layer 60 of the insulation in a position upstream from the orifice 32, whereby the outer layer 62 is applied to the inner layer under extrusion pressure. The two layers which are then merged together issue through the extrusion orifice as a single layer of material.

What is claimed is:

1. A cable having a cable core surrounded by an insulating jacket with at least one longitudinally extending tensile tape member embedded therein, the tape member formed from succeeding lengths of tensile tape with each length having end portions and the end portions overlap from one length to another, and at each overlap position, one end portion has projections interengaged with corresponding identations in the other end portion.

2. A cable according to claim 1, wherein each tape has indentations and projections formed by corrugations extending transversely of the tape for part of its width, the remainder of the width being substantially planar.

* * * * *